United States Patent
Oishi et al.

(10) Patent No.: US 8,019,524 B2
(45) Date of Patent: Sep. 13, 2011

(54) CONTROL APPARATUS FOR DRIVING SOURCE

(75) Inventors: Toshiya Oishi, Toyota (JP); Seiji Kuwahara, Toyota (JP); Shinichi Soejima, Gotenba (JP); Ken Koibuchi, Hadano (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 140 days.

(21) Appl. No.: 12/580,444

(22) Filed: Oct. 16, 2009

(65) Prior Publication Data

US 2010/0095931 A1    Apr. 22, 2010

(30) Foreign Application Priority Data

Oct. 16, 2008 (JP) ................. 2008-267722

(51) Int. Cl.
*G06F 19/00* (2011.01)
*G06G 7/70* (2006.01)

(52) U.S. Cl. ........ 701/102; 701/103; 701/106; 701/115; 123/319; 123/396

(58) Field of Classification Search ........ 123/319, 123/321, 322, 345–348, 395, 396, 402–405; 701/102, 103, 106, 110, 115
See application file for complete search history.

(56) References Cited

U.S. PATENT DOCUMENTS

| | | | |
|---|---|---|---|
| 5,605,131 A * | 2/1997 | Ohno et al. | 123/399 |
| 6,742,498 B2 * | 6/2004 | Mabuchi et al. | 123/339.16 |
| 7,206,690 B2 * | 4/2007 | Kuwahara et al. | 701/110 |
| 7,698,048 B2 * | 4/2010 | Jung et al. | 701/103 |
| 2001/0037793 A1 * | 11/2001 | Robichaux et al. | 123/339.19 |
| 2009/0069971 A1 | 3/2009 | Asahara et al. | |
| 2009/0118968 A1 * | 5/2009 | Livshiz et al. | 701/102 |
| 2010/0030398 A1 | 2/2010 | Kuwahara et al. | |
| 2010/0057283 A1 * | 3/2010 | Worthing et al. | 701/22 |

FOREIGN PATENT DOCUMENTS

| | | |
|---|---|---|
| JP | 11082090 A | 3/1999 |
| JP | 2003214231 A | 7/2003 |
| JP | 2006138265 A | 6/2006 |
| JP | 2006290235 A | 10/2006 |
| JP | 2009167873 A | 7/2009 |
| JP | 201037951 A | 2/2010 |
| WO | WO-2009090797 A1 | 7/2009 |

OTHER PUBLICATIONS

Decision to Grant Patent with translation; mailed Feb. 8, 2011, 3 pages.
Notice of Grounds of Rejection with translation and declaration; mailed Oct. 5, 2010, 7 pages.

* cited by examiner

*Primary Examiner* — Willis R Wolfe, Jr.
*Assistant Examiner* — Anthony L Bacon
(74) *Attorney, Agent, or Firm* — Gifford, Krass, Sprinkle, Anderson & Citkowski, P.C.

(57) ABSTRACT

A first arbitration unit determines one demand engine torque of static demand engine torques set in a power train driver model and an ECT torque control system. The demand engine torque determined by the first arbitration unit is converted into dynamic demand engine torque by a conversion unit. A second arbitration unit determines demand engine torque for use in control of an engine from among the dynamic demand engine torque converted from the static demand engine torque by the conversion unit, dynamic demand engine torque set by a VDIM system, and dynamic demand engine torque set by a vibration suppression control system. An engine control system controls the engine according to the demand engine torque determined by the second arbitration unit.

8 Claims, 13 Drawing Sheets

FIG. 3

|     | C1 | C2 | C3 | C4 | B1 | B2 | F |
|-----|----|----|----|----|----|----|----|
| P   | ×  | ×  | ×  | ×  | ×  | ×  | × |
| R1  | ×  | ×  | ○  | ×  | ×  | ○  | × |
| R2  | ×  | ×  | ×  | ○  | ×  | ○  | × |
| N   | ×  | ×  | ×  | ×  | ×  | ×  | × |
| 1ST | ○  | ×  | ×  | ×  | ×  | ◎  | △ |
| 2ND | ○  | ×  | ×  | ×  | ○  | ×  | × |
| 3RD | ○  | ×  | ○  | ×  | ×  | ×  | × |
| 4TH | ○  | ×  | ×  | ○  | ×  | ×  | × |
| 5TH | ○  | ○  | ×  | ×  | ×  | ×  | × |
| 6TH | ×  | ○  | ×  | ○  | ×  | ×  | × |
| 7TH | ×  | ○  | ○  | ×  | ×  | ×  | × |
| 8TH | ×  | ○  | ×  | ×  | ○  | ×  | × |

○ ENGAGEMENT
× DISENGAGEMENT
◎ ENGAGEMENT AT THE TIME OF ENGINE BRAKING
△ ENGAGEMENT ONLY AT THE TIME OF DRIVING ns of what # CONTROL APPARATUS FOR DRIVING SOURCE This nonprovisional application is based on Japanese Patent Application No. 2008-267722. filed on Oct. 16, 2008. with the Japan Patent Office, the entire contents of which are hereby incorporated by reference.

BACKGROUND OF THE INVENTION

1. Field of the Invention

The present invention relates to a control apparatus for a driving source, and more particularly to a technique of setting a dynamic demand value and a static demand value concerning driving force of a vehicle and controlling a driving source according to the demand value obtained by arbitrating the set demand values.

2. Description of the Background Art

Conventionally, there is a known engine in which a value of output torque or the like is determined by an opening position of a throttle valve (hereinafter, also referred to as a throttle opening position) or the like. In general, the throttle opening position is actuated so as to chiefly correspond to a position of an accelerator pedal (hereinafter, also referred to as an accelerator pedal position). However, when the throttle opening position and the accelerator pedal position always chiefly correspond to each other, driving force of a vehicle or the like is not easily controlled irrespective of an intention of a driver for example in the case where the behavior of the vehicle is disordered. Therefore, there is a vehicle provided with an electronic throttle valve actuated by an actuator in an engine so as to be capable of controlling the output torque and the like not depending on the accelerator pedal position. In the vehicle provided with the electronic throttle value, it is possible to set demand engine torque based on the behavior of the vehicle in addition to the accelerator pedal position and control the engine so that actual engine torque is the set demand engine torque.

Japanese Patent Laying-Open No. 2006-290235. discloses a driving force control apparatus including a driver model and a powertrain manager for tuning a characteristic related to human sense other than a hardware characteristic of a vehicle in a target transient property addition calculating unit included in the driver model, and tuning the hardware characteristic of the vehicle other than the characteristic related to human sense in a characteristic compensator included in the powertrain manager so as to distinguish the human sense and the hardware characteristic of the vehicle. The driver model calculates target driving force based on a map in which the target driving force is determined by a vehicle speed for example taking the accelerator pedal position as a parameter in a target base driving force calculating unit (static characteristic), and calculates final target driving force by giving a transient property to the target driving force in the target transient property addition calculating unit. The powertrain manager calculates demand engine torque in the characteristic compensator based on the target engine torque output from a target engine torque and AT gear calculating unit. In the characteristic compensator, a response property of a vehicle G serving as an acceleration generated in the vehicle, that is, a portion depending on the hardware characteristic of the vehicle is compensated.

In order to set final demand engine torque, there is a need to consider dynamic demand engine torque in consideration of the transient property of the engine or the like and also static demand engine torque for example for realizing torque-down or torque-up at the time of shifting of an automatic transmission. The dynamic demand engine torque indicates engine torque in an engine transition state. Meanwhile, the static demand engine torque indicates engine torque in an engine steady state. Therefore, it is not possible to simply compare the dynamic demand engine torque and the static demand engine torque. However, Japanese Patent Laying-Open No. 2006-290235. does not describe how the final demand engine torque is set from the dynamic demand engine torque and the static demand engine torque. Therefore, it is not possible to set the final demand engine torque in consideration of both the dynamic demand engine torque and the static demand engine torque. Consequently, there is further room for improving control accuracy of the engine serving as a driving source.

SUMMARY OF THE INVENTION

An object of the present invention is to improve control accuracy of a driving source.

A control apparatus in accordance with an embodiment is provided for a driving source mounted on a vehicle. The control apparatus includes: a plurality of first demand units for setting one of a set of dynamic demand values and a set of static demand values concerning driving force of the vehicle; a first arbitration unit for collecting the demand values set in the plurality of first demand units and arbitrating the demand values set by the plurality of first demand units so as to determine one demand value of the demand values set by the plurality of first demand units; a conversion unit for converting the demand value determined by the first arbitration unit into the other of the dynamic demand value and the static demand value; a second demand unit for setting the other of the dynamic demand value and the static demand value; a second arbitration unit for collecting the demand value converted by the conversion unit and the demand value set by the second demand unit and arbitrating the demand value converted by the conversion unit and the demand value set by the second demand unit so as to determine a demand value for use in control of the driving source from among the demand value converted by the conversion unit and the demand value set by the second demand unit; and a control unit for controlling the driving source according to the demand value determined by the second arbitration unit.

According to this configuration, one of the set of dynamic demand values and the set of static demand values concerning driving force of the vehicle is set in a plurality of first demand units, and the other is set in the second demand unit. The demand values set in a plurality of first demand units are collected in the first arbitration unit. The first arbitration unit arbitrates the demand values set by a plurality of first demand units so as to determine one demand value of the demand values set by a plurality of first demand units. The demand value determined by the first arbitration unit is converted into the other of the dynamic demand value and the static demand value. Accordingly, a plurality of demand values different in characteristic can be uniformed. The converted demand value is collected in the second arbitration unit together with a demand value set by the second demand unit. The second arbitration unit arbitrates the demand value converted by the conversion unit and the demand value set by the second demand unit so as to determine a demand value for use in control of the driving source from among the demand value converted by the conversion unit and the demand value set by the second demand unit. Accordingly, a more suitable demand value can be obtained in consideration of both the dynamic demand value and the static demand value. A control unit controls the driving source according to the demand value determined by the second arbitration unit. Therefore, the control accuracy of the driving source can be improved.

Preferably, the number of the conversion unit is one.

Further preferably, the control unit converts the demand value determined by the second arbitration unit into one of the dynamic demand value and the static demand value using a model defining a correspondence between the dynamic demand value and the static demand value and controls the driving source according to the demand value converted into one of the dynamic demand value and the static demand value. The conversion unit converts the demand value determined by the first arbitration unit into the other of the dynamic demand value and the static demand value, using the model inversely.

Further preferably, a plurality of second demand units are provided. The second arbitration unit collects the demand value converted by the conversion unit and the demand values set by the plurality of second demand units and arbitrates the demand value converted by the conversion unit and the demand values set by the plurality of second demand units so as to determine a demand value for use in control of the driving source from among the demand value converted by the conversion unit and the demand values set by the plurality of second demand units.

Further preferably, one of the dynamic demand value and the static demand value is a static demand value. The other of the dynamic demand value and the static demand value is a dynamic demand value.

Further preferably, the demand value is output torque of the driving source. The control unit performs control such that output torque of the driving source becomes output torque determined by the second arbitration unit.

Further preferably, the demand value is driving force of the vehicle. The control unit controls the driving source such that driving force of the vehicle becomes driving force determined by the second arbitration unit.

Further preferably, the demand value is an acceleration of the vehicle. The control unit controls the driving source such that an acceleration of the vehicle becomes an acceleration determined by the second arbitration unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a working table of the automatic transmission.

DESCRIPTION OF THE PREFERRED EMBODIMENTS

Figure 1:
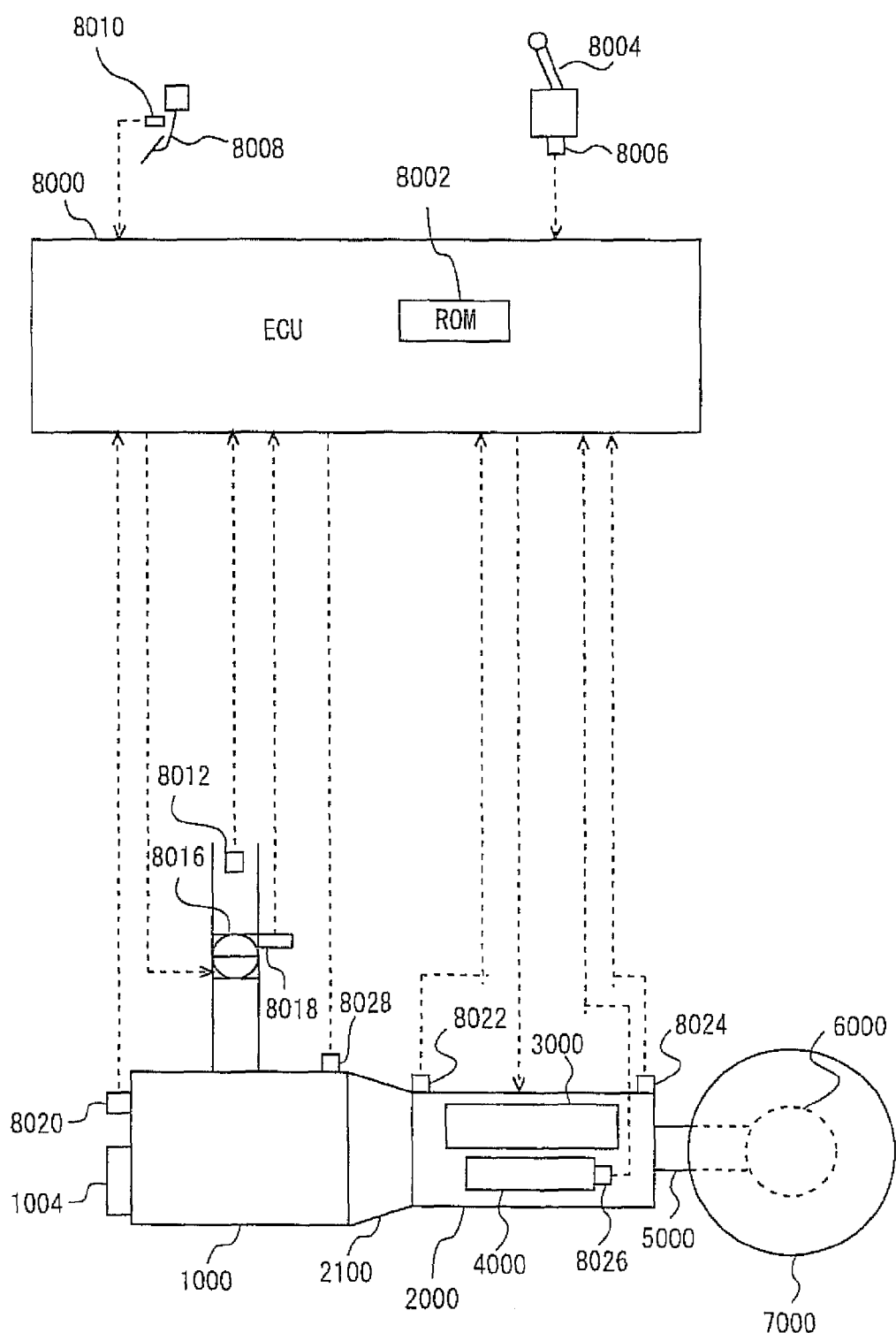
FIG. 1 is a schematic configuration diagram showing a powertrain of a vehicle.

An embodiment of the present invention will be described below with reference to the drawings. In the following description, the same parts are given the same reference numerals. Names and functions thereof are all the same. Therefore, a detailed description thereof will not be repeated.

With reference to FIG. 1, a vehicle installed with a control apparatus according to the embodiment of the present invention will be described. This vehicle is an FR (Front engine Rear drive) vehicle. It should be noted that this vehicle may be a vehicle other than the FR vehicle.

The vehicle includes an engine 1000, an automatic transmission 2000, a torque converter 2100, a planetary gear unit 3000 constituting part of automatic transmission 2000, an oil hydraulic circuit 4000 constituting part of automatic transmission 2000, a propeller shaft 5000, a differential gear 6000, rear wheels 7000, and an ECU (Electronic Control Unit) 8000.

Engine 1000 is an internal combustion engine for combusting an air-fuel mixture of fuel injected from an injector (not shown) and the air in a combustion chamber of a cylinder. A piston in the cylinder is pushed down by the combustion and a crankshaft is rotated. An auxiliary machine 1004 such as an alternator and an air conditioner is driven by engine 1000. Output torque of engine 1000 (engine torque TE) is changed in accordance with an actuated amount of an electronic throttle valve 8016, that is, a throttle opening position or the like. It should be noted that a motor may be used as a driving source instead of or in addition to engine 1000. Alternatively, a diesel engine may be used. In the diesel engine, output torque is changed in accordance with the valve opening time of the injector (the actuated amount), that is, a fuel injection amount.

Automatic transmission 2000 is coupled to engine 1000 with torque converter 2100 interposed therebetween. Automatic transmission 2000 implements a desired gear so as to shift the revolution number of the crankshaft to a desired revolution number. It should be noted that a CVT (Continuously Variable Transmission) for continuously changing a gear ratio may be installed instead of the automatic transmission implementing a gear. Further, another automatic transmission configured by a constant-meshing type gear shifted by an oil hydraulic actuator or an electric motor may be installed.

Driving force output from automatic transmission 2000 is transmitted to right and left rear wheels 7000 through propeller shaft 5000 and differential gear 6000.

A position switch 8006 of a shift lever 8004, an accelerator pedal position sensor 8010 of an accelerator pedal 8008, an air flow meter 8012, a throttle opening position sensor 8018 of electronic throttle valve 8016, an engine speed sensor 8020, an input shaft speed sensor 8022, an output shaft speed sensor

8024, an oil temperature sensor 8026, and a water temperature sensor 8028 are connected to ECU 8000 through a harness and the like.

A position of shift lever 8004 is detected by position switch 8006, and a signal representing a detection result is transmitted to ECU 8000. The gear of automatic transmission 2000 is automatically implemented in response to the position of shift lever 8004. A driver may select a manual shift mode in which the driver can select any gear in accordance with operations of the driver.

Accelerator pedal position sensor 8010 detects a position of accelerator pedal 8008 and transmits a signal representing a detection result to ECU 8000. Air flow meter 8012 detects an amount of air to be taken in engine 1000 and transmits a signal representing a detection result to ECU 8000.

Throttle opening position sensor 8018 detects an opening position of electronic throttle valve 8016 adjusted by an actuator and transmits a signal representing a detection result to ECU 8000. The amount of air to be taken in engine 1000 is adjusted by electronic throttle valve 8016.

It should be noted that the amount of air to be taken in engine 1000 may be adjusted by a variable valve lift system of changing the lift amount or opening/closing phase of an intake valve (not shown) or an exhaust valve (not shown) instead of or in addition to electronic throttle valve 8016.

Engine speed sensor 8020 detects the revolution number of an output shaft (the crankshaft) of engine 1000 (hereinafter, also referred to as engine revolution number NE) and transmits a signal representing a detection result to ECU 8000. Input shaft speed sensor 8022 detects the input shaft revolution number NI of automatic transmission 2000 (the turbine revolution number NT of torque converter 2100) and transmits a signal representing a detection result to ECU 8000. Output shaft speed sensor 8024 detects the output shaft revolution number NO of automatic transmission 2000 and transmits a signal representing a detection result to ECU 8000.

Oil temperature sensor 8026 detects a temperature (an oil temperature) of oil used for actuating and lubricating automatic transmission 2000 (ATF: Automatic Transmission Fluid) and transmits a signal representing a detection result to ECU 8000.

Water temperature sensor 8028 detects a temperature of coolant of engine 1000 (a water temperature) and transmits a signal representing a detection result to ECU 8000.

ECU 8000 controls devices so that the vehicle is in a desired traveling state based on the signals transmitted from position switch 8006, accelerator pedal position sensor 8010, air flow meter 8012, throttle opening position sensor 8018, engine speed sensor 8020, input shaft speed sensor 8022, output shaft speed sensor 8024, oil temperature sensor 8026, water temperature sensor 8028, and the like, a map and a program stored in a ROM (Read Only Memory) 8002. It should be noted that the program to be executed by ECU 8000 may be stored in a recording medium such as a CD (Compact Disc) and a DVD (Digital Versatile Disc) and distributed on the market.

In the present embodiment, ECU 8000 controls automatic transmission 2000 so that any of first to eighth forward gears is implemented in the case where a D (drive) range is selected as a shift range of automatic transmission 2000 by placing shift lever 8004 at a D (drive) position. Since any gear among the first to eighth forward gears is implemented, automatic transmission 2000 can transmit the driving force to rear wheels 7000. It should be noted that a gear of a higher speed than the eighth gear may be implemented in the D range. A gear to be implemented is determined based on a shift map preliminarily prepared by an experiment or the like taking the vehicle speed and the accelerator pedal position as parameters. It should be noted that ECU may be divided into a plurality of ECUs.

Figure 2:
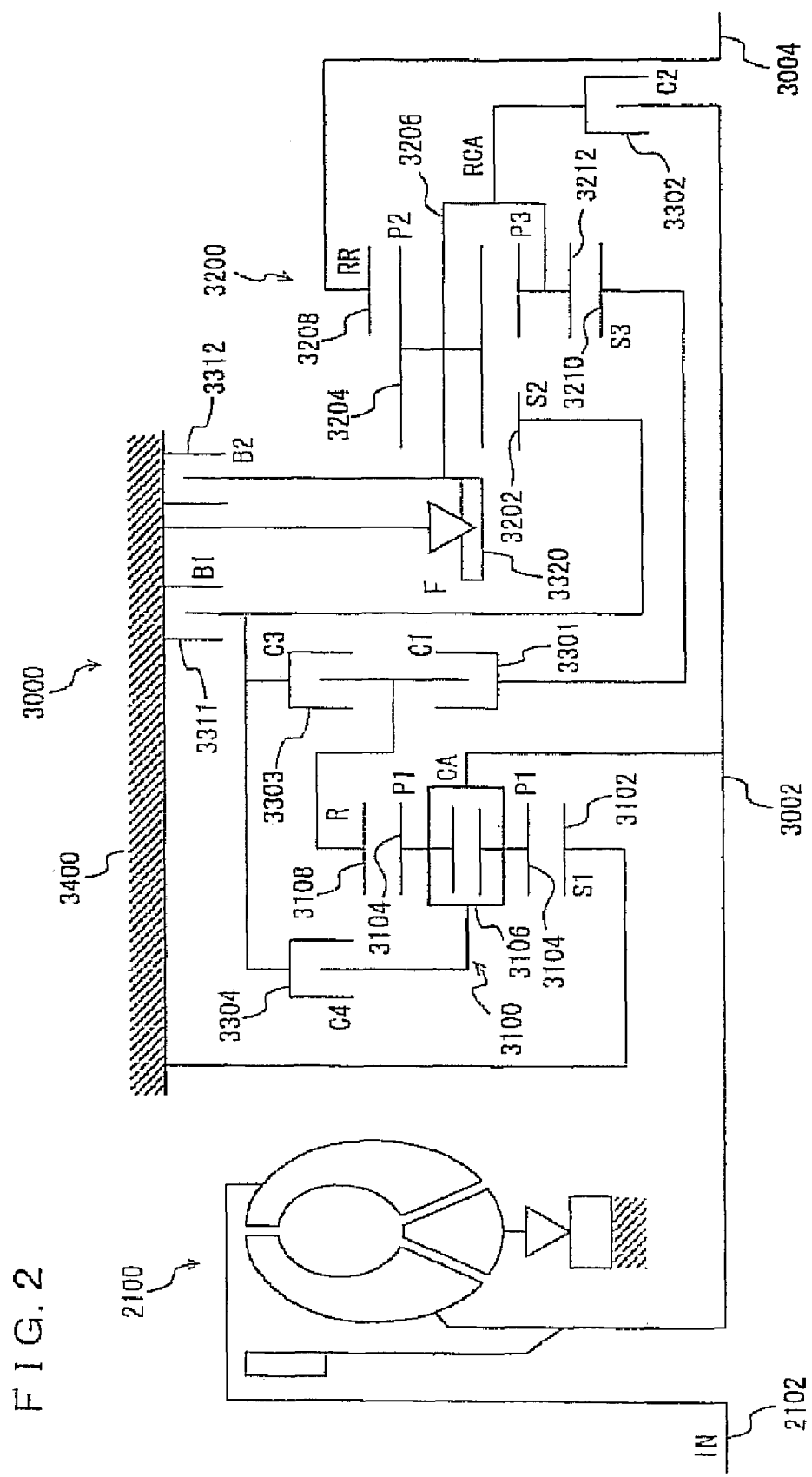
FIG. 2 is a skeleton diagram showing a planetary gear unit of an automatic transmission.

With reference to FIG. 2, planetary gear unit 3000 will be described. Planetary gear unit 3000 is connected to torque converter 2100 having an input shaft 2102 coupled to the crankshaft.

Planetary gear unit 3000 includes a front planetary 3100, a rear planetary 3200, a C1 clutch 3301, a C2 clutch 3302, a C3 clutch 3303, a C4 clutch 3304, a B1 brake 3311, a B2 brake 3312, and a one-way clutch (F) 3320.

Front planetary 3100 is a planetary gear mechanism of a double pinion type. Front planetary 3100 includes a first sun gear (S1) 3102, a pair of first pinion gears (P1) 3104, a carrier (CA) 3106, and a ring gear (R) 3108.

First pinion gears (P1) 3104 are meshed with first sun gear (S1) 3102 and first ring gear (R) 3108. First carrier (CA) 3106 supports first pinion gears (P1) 3104 so that first pinion gears (P1) 3104 can be rotated around an outer axis and also around their own axes.

First sun gear (S1) 3102 is fixed to a gear case 3400 so as not to rotate. First carrier (CA) 3106 is coupled to an input shaft 3002 of planetary gear unit 3000.

Rear planetary 3200 is a Ravigneaux type planetary gear mechanism. Rear planetary 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

Second pinion gear (P2) 3204 is meshed with second sun gear (S2) 3202, rear ring gear (RR) 3208, and third pinion gear (P3) 3212. Third pinion gear (P3) 3212 is meshed with third sun gear (S3) 3210 in addition to second pinion gear (P2) 3204.

Rear carrier (RCA) 3206 supports second pinion gear (P2) 3204 and third pinion gear (P3) 3212 so that second pinion gear (P2) 3204 and third pinion gear (P3) 3212 can be rotated around an outer axis and also around their own axes. Rear carrier (RCA) 3206 is coupled to one-way clutch (F) 3320. Rear carrier (RCA) 3206 cannot be rotated when driving in the first gear (when the vehicle travels by using driving force output from engine 1000). Rear ring gear (RR) 3208 is coupled to an output shaft 3004 of planetary gear unit 3000.

One-way clutch (F) 3320 is provided in parallel to B2 brake 3312. That is, an outer race of one-way clutch (F) 3320 is fixed to gear case 3400, and an inner race is coupled to rear carrier (RCA) 3206.

FIG. 3 shows a working table illustrating a relationship between the shift gears and working states of the clutches and the brakes. First to eighth forward gears and first and second reverse gears are implemented by actuating the brakes and the clutches in combinations shown in this working table.

Figure 4:
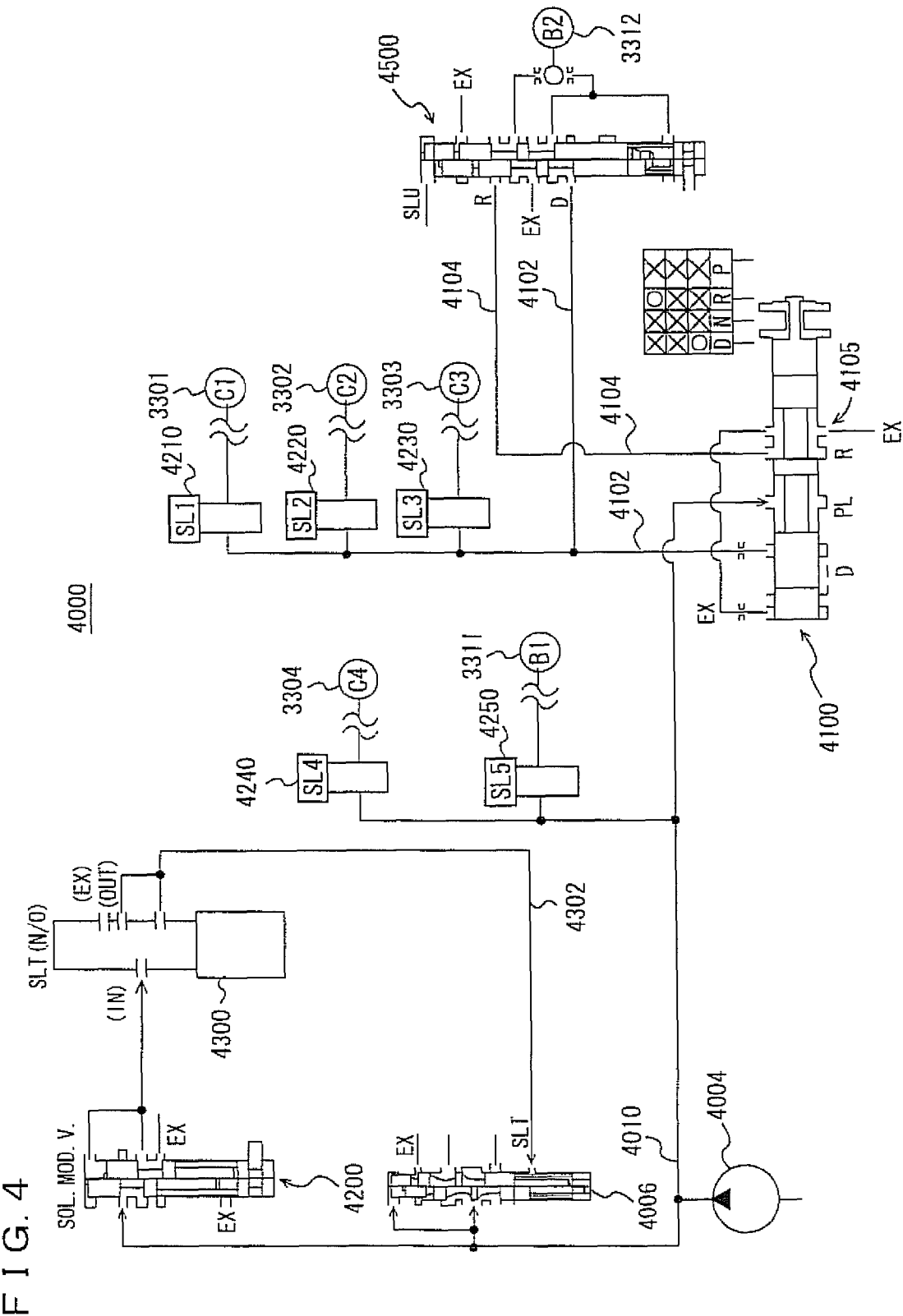
FIG. 4 is a diagram showing an oil hydraulic circuit of the automatic transmission.

With reference to FIG. 4, a principal portion of oil hydraulic circuit 4000 will be described. It should be noted that oil hydraulic circuit 4000 is not limited to the one described below.

Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SL5 linear solenoid (hereinafter, indicated as SL (5)) 4250, an SLT linear solenoid (hereinafter, indicated as SLT) 4300, and a B2 control valve 4500.

Oil pump 4004 is coupled to the crankshaft of engine 1000. Oil pump 4004 is driven by rotation of the crankshaft so as to generate oil pressure. The oil pressure generated in oil pump 4004 is regulated by primary regulator valve 4006 so as to generate line pressure.

Primary regulator valve 4006 is actuated taking throttle pressure regulated by SLT 4300 as pilot pressure. The line pressure is supplied to manual valve 4100 through a line pressure oil channel 4010.

Manual valve 4100 includes a drain port 4105. The oil pressure of a D range pressure oil channel 4102 and an R range pressure oil channel 4104 is discharged from drain port 4105. In the case where a spool of manual valve 4100 is at a D position, line pressure oil channel 4010 communicates with D range pressure oil channel 4102. Therefore, the oil pressure is supplied to D range pressure oil channel 4102. At this point, R range pressure oil channel 4104 communicates with drain port 4105. Therefore, R range pressure of R range pressure oil channel 4104 is discharged from drain port 4105.

In the case where the spool of manual valve 4100 is at an R position, line pressure oil channel 4010 communicates with R range pressure oil channel 4104. Therefore, the oil pressure is supplied to R range pressure oil channel 4104. At this point, D range pressure oil channel 4102 communicates with drain port 4105. Therefore, D range pressure of D range pressure oil channel 4102 is discharged from drain port 4105.

In the case where the spool of manual valve 4100 is at an N position, both D range pressure oil channel 4102 and R range pressure oil channel 4104 communicate with drain port 4105. Therefore, the D range pressure of D range pressure oil channel 4102 and the R range pressure of R range pressure oil channel 4104 are discharged from drain port 4105.

The oil pressure supplied to D range pressure oil channel 4102 is eventually supplied to C1 clutch 3301, C2 clutch 3302, and C3 clutch 3303. The oil pressure supplied to R range pressure oil channel 4104 is eventually supplied to B2 brake 3312.

Solenoid modulator valve 4200 regulates the oil pressure to be supplied to SLT 4300 (solenoid modulator pressure) to a constant level taking the line pressure as source pressure.

SL (1) 4210 regulates the oil pressure supplied to C1 clutch 3301. SL (2) 4220 regulates the oil pressure supplied to C2 clutch 3302. SL (3) 4230 regulates the oil pressure supplied to C3 clutch 3303. SL (4) 4240 regulates the oil pressure supplied to C4 clutch 3304. SL (5) 4250 regulates the oil pressure supplied to B1 brake 3311.

SLT 4300 regulates the solenoid modulator pressure in accordance with a control signal from ECU 8000 based on the accelerator pedal position detected by accelerator pedal position sensor 8010 so as to generate the throttle pressure. The throttle pressure is supplied to primary regulator valve 4006 through an SLT oil channel 4302. The throttle pressure is used as the pilot pressure of primary regulator valve 4006.

SL (1) 4210, SL (2) 4220, SL (3) 4230, SL (4) 4240, SL (5) 4250, and SLT 4300 are controlled by the control signal sent from ECU 8000.

B2 control valve 4500 selectively supplies the oil pressure from one of D range pressure oil channel 4102 and R range pressure oil channel 4104 to B2 brake 3312. D range pressure oil channel 4102 and R range pressure oil channel 4104 are connected to B2 control valve 4500. B2 control valve 4500 is controlled by the oil pressure supplied from an SLU solenoid valve (not shown) and the urge of a spring.

In the case where the SLU solenoid valve is ON, B2 control valve 4500 attains the left side state of FIG. 4. In this case, B2 brake 3312 is supplied with oil pressure obtained by regulating the D range pressure taking the oil pressure supplied from the SLU solenoid valve as the pilot pressure.

In the case where the SLU solenoid valve is OFF, B2 control valve 4500 attains the right side state of FIG. 4. In this case, B2 brake 3312 is supplied with the R range pressure.

Figure 5:
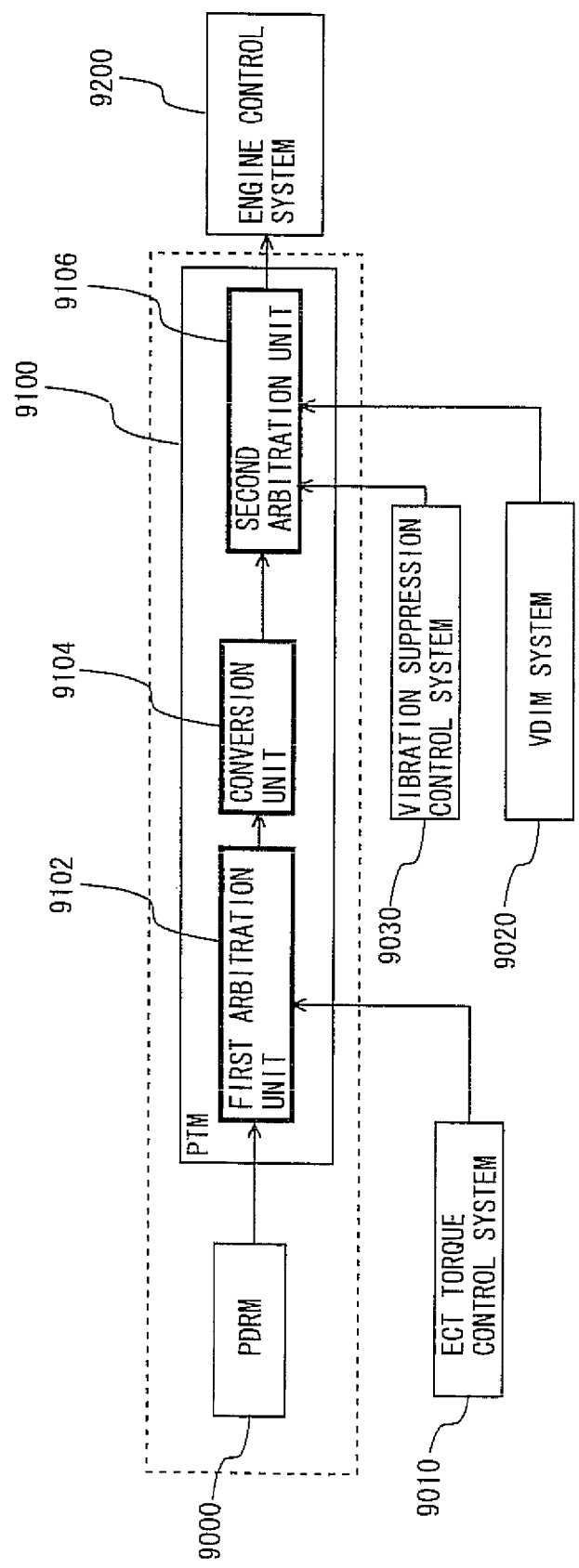
FIG. 5 is a diagram showing a system configuration of a control apparatus in accordance with an embodiment of the present invention.

With reference to FIG. 5, a system configuration of a control apparatus in accordance with the present embodiment will be described. It should be noted that the functions in the configuration described below may be realized by hardware or may be realized by software.

As shown in FIG. 5, the control apparatus includes a Power train Driver Model (PDRM) 9000, an ECT (Electronic Controlled Transmission) torque control system 9010, a VDIM (Vehicle Dynamics Integrated Management) system 9020, a vibration suppression control system 9030, a Power Train Manager (PTM) 9100, and an engine control system 9200.

Power train driver model 9000 is a model (function) used to set a driver's demand engine torque (a demand value of output torque of engine 1000) for engine 1000, based on the driver's operation. The demand engine torque can be said as target engine torque.

The engine torque is converted into driving force by multiplying the engine torque by the present gear ratio of automatic transmission 2000 and the gear ratio of differential gear 6000 and then dividing the result by the radius of rear wheel 7000. Therefore, the demand engine torque is a demand value concerning the driving force of the vehicle.

In the present embodiment, the demand engine torque is set from the accelerator pedal position, a vehicle speed, and the like, in accordance with a predetermined engine torque map based on the results of experiments and simulations.

Figure 6:
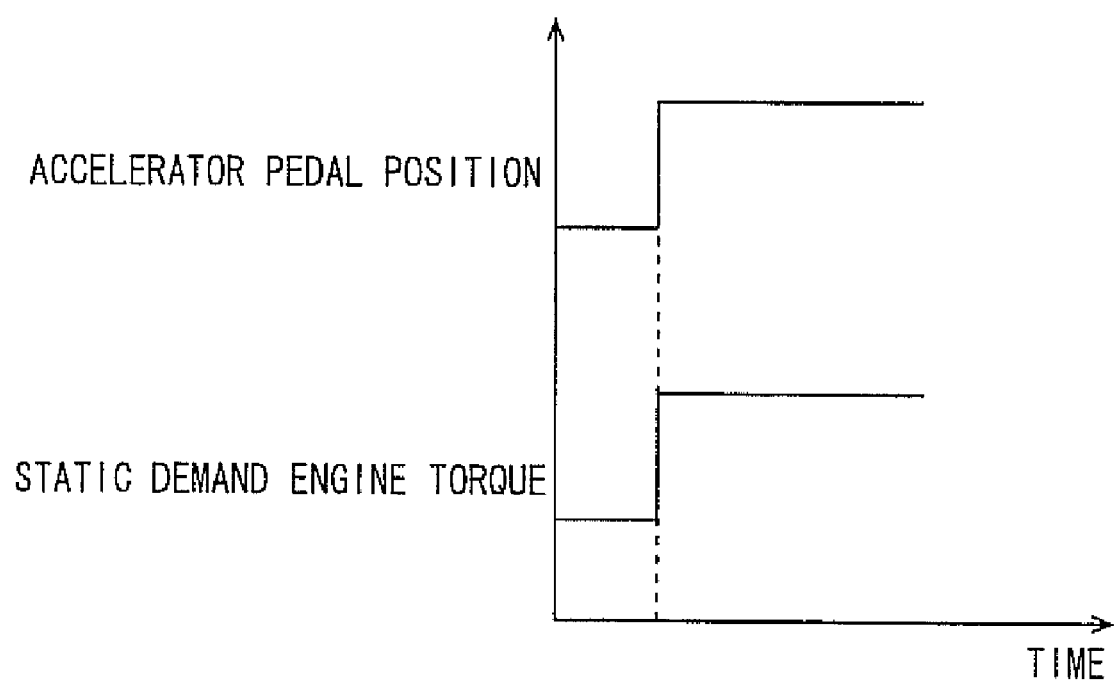
FIG. 6 is a graph showing static demand engine torque.

More specifically, static demand engine torque for engine 1000 is set from an accelerator pedal position, a vehicle speed, and the like. The static demand engine torque means demand engine torque in a state in which output torque of engine 1000 is stable. The static demand engine torque is determined without considering temporal effects such as responsivity of such components as throttle valve 8016 and a delay in control, as shown in FIG. 6.

Returning to FIG. 5, ECT torque control system 9010 sets static demand engine torque requested of engine 1000 at the time of shifting gears of automatic transmission 2000. The static demand engine torque set by ECT torque control system 9010 is set, for example, such that torque-down or torque-up for reducing shift shock can be realized.

Figure 7:
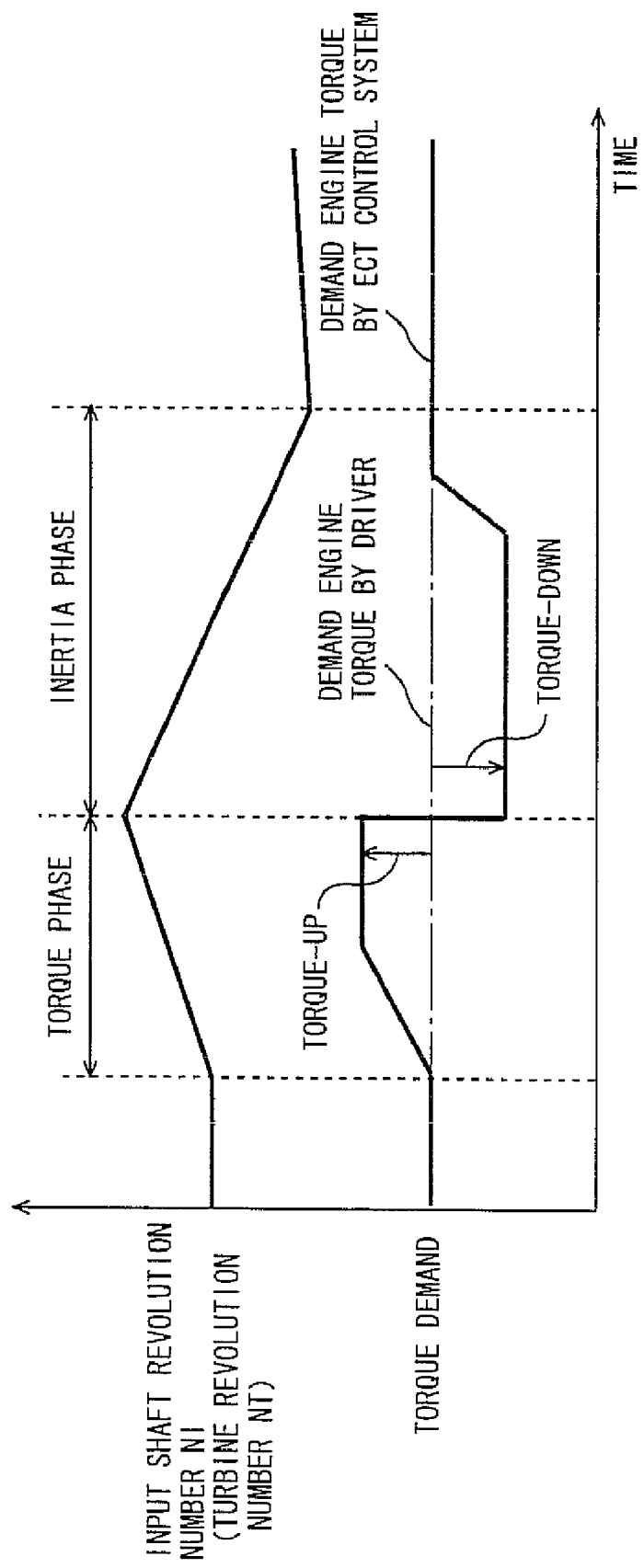
FIG. 7 is a graph showing static demand engine torque during up-shifting.

As shown in FIG. 7, at a time of up-shifting, torque-up is carried out so that engine torque is larger than the driver's demand engine torque for engine 1000 in the torque phase, and torque-down is carried out so that the engine torque is smaller than the driver's demand torque for engine 1000 in the inertia phase.

Returning to FIG. 5, VDIM system 9020 sets dynamic demand engine torque requested of engine 1000 in order to stabilize the behavior of the vehicle. The dynamic demand engine torque means demand engine torque in a transient state in which output torque of engine 1000 may change. The dynamic demand engine torque is determined in consideration of temporal effects such as responsivity of such components as electronic throttle valve 8016, a delay in control, and the like.

VDIM system 9020 is a system in which VSC (Vehicle Stability Control), TRC (TRaction Control), ABS (Anti lock Brake System), EPS (Electric Power Steering), and the like are integrated. VDIM system 9020 calculates the difference between the driver's driving image based on the operation amounts of the accelerator, the steering, and the brake and the vehicle behavior based on a variety of sensor information, and controls the driving force of the vehicle, the brake oil pressure, and the like to decrease the difference.

VSC is the control for securing the vehicle stability by automatically setting the optimum value of the brake oil pressure of wheels and the dynamic demand engine torque of the vehicle when a sensor detects a state in which the front and rear wheels are likely to skid.

TRC is the control for securing the optimum driving force by automatically setting the optimum value of the brake oil pressure of wheels and the dynamic demand engine torque of the vehicle when a sensor senses spinning of the driving wheels at a time of starting and acceleration on a slippery road.

ABS is a control system for preventing locking of wheels by automatically setting the optimum value of the brake oil pressure. EPS is a control system for assisting steering of a steering wheel using a force of an electric motor.

Vibration suppression control system 9030 sets dynamic demand engine torque for suppressing vehicular pitching and bouncing as calculated using a vehicle model from the actual driving force of the vehicle. A conventional technique may be employed for setting engine torque for suppressing vehicular pitching and bouncing, and therefore a detailed description thereof will not be repeated here.

Power train manager 9100 determines dynamic demand engine torque that is finally used for control of engine 1000, based on the static demand engine torque input from power train driver model 9000 and ECT torque control system 9010 and the dynamic demand engine torque input from VDIM system 9020 and vibration suppression control system 9030.

The dynamic demand engine torque determined by power train manager 9100 is input to engine control system 9200.

Engine control system 9200 controls electronic throttle valve 8016, an ignition timing, and components provided for engine 1000 for controlling the output torque of engine 1000, such as EGR (Exhaust Gas Recirculation) valve, so as to realize the dynamic demand engine torque input from power train manager 9100.

In other words, engine control system 9200 controls engine 1000 in accordance with the dynamic demand engine torque determined by power train manager 9100. Engine control system 9200 performs control such that the engine torque becomes the dynamic demand engine torque determined by power train manager 9100.

Figure 8:
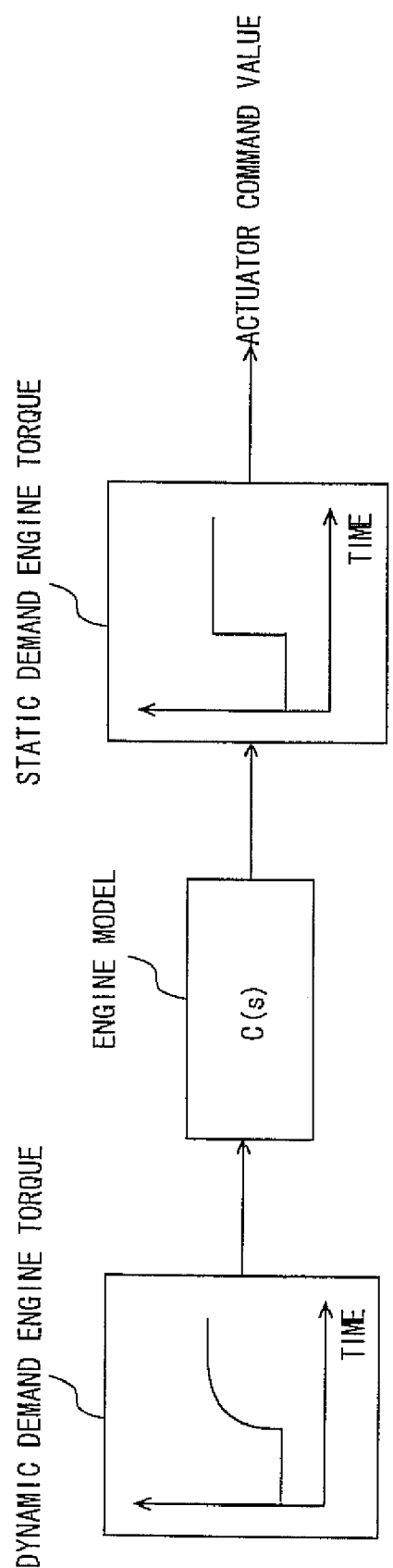
FIG. 8 is a first diagram showing an engine model C(s) for converting dynamic demand engine torque into static demand engine torque.

More specifically, in order to realize the transient property of engine 1000, that is, in order to realize the dynamic demand engine torque, as shown in FIG. 8, engine control system 9200 converts the dynamic demand engine torque determined by power train manager 9100 into static demand engine torque, using an engine model C(s) which defines the correspondence between the dynamic demand engine torque and the static demand engine torque. Engine control system 9200 controls engine 1000 in accordance with the static demand engine torque converted from the dynamic demand engine torque.

Figure 9:
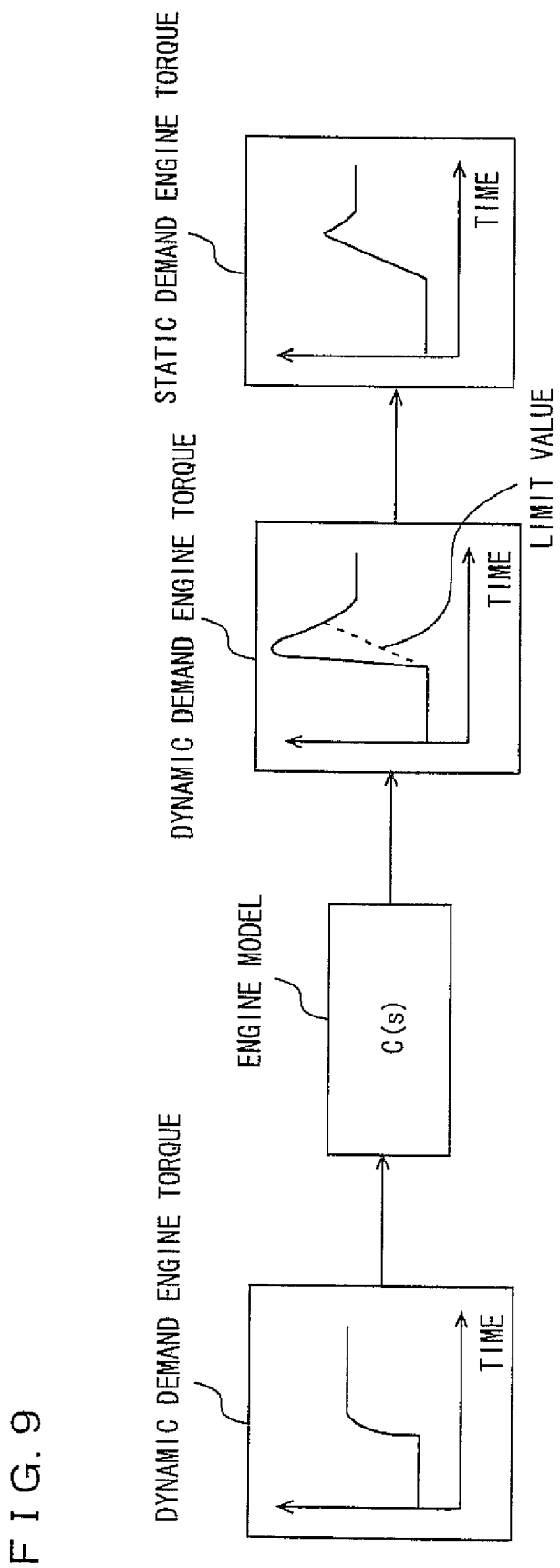
FIG. 9 is a second diagram showing an engine model C(s) for converting dynamic demand engine torque into static demand engine torque.

Here, as shown in FIG. 9, the dynamic demand engine torque may be converted into the static demand engine torque by removing a delay in control of such components as electronic throttle valve 8016 from the dynamic demand engine torque using engine model C(s) and limiting the dynamic demand engine torque by a limit value determined according to a threshold value of the actuated amount of such components as electronic throttle valve 8016.

Engine model C(s) is defined, for example, as a function. Furthermore, engine model C(s) is defined based on the results of simulations and experiments at a development stage of engine 1000. The method of defining engine model C(s) is not limited to those described above.

Returning to FIG. 5, the dynamic demand engine torque for use in control of engine 1000 is determined in power train manager 9100 by arbitrating the static demand engine torque input from power train driver model 9000 and ECT torque control system 9010 and the dynamic demand engine torque input from VDIM system 9020 and vibration suppression control system 9030.

In order to arbitrate the static demand engine torque and the dynamic demand engine torque, power train manager 9100 includes a first arbitration unit 9102, a conversion unit 9104, and a second arbitration unit 9106.

First arbitration unit 9102 of power train manager 9100 collects the static demand engine torques set in power train driver model 9000 and ECT torque control system 9010. In addition, first arbitration unit 9102 arbitrates the static demand engine torques set in power drain driver model 9000 and ECT torque control system 9010 so that one of the static demand engine torques set in power train driver model 9000 and ECT torque control system 9010 is determined (selected).

For example, the maximum or minimum static demand engine torque is determined depending on the operation state of the vehicle. When a predetermined condition is satisfied, static demand engine torque requested by a particular system of power train driver model 9000 and ECT torque control system 9010 is determined. The method of arbitrating the static demand engine torques is not limited to those described above.

The static demand engine torque determined by first arbitration unit 9102 is converted into dynamic demand engine torque by conversion unit 9104 of power train manager 9100. Accordingly, in the control apparatus including both of a system for setting static demand engine torque and a system for setting dynamic demand engine torque, all of the demand engine torques can be treated as dynamic demand values. Therefore, even the static demand engine torque is compared with the dynamic demand engine torque, so that the demand engine torque in consideration of both the dynamic demand engine torque and the static demand engine torque can be obtained. As a result, the control accuracy of engine 1000 can be improved using more suitable demand engine torque.

Figure 10:
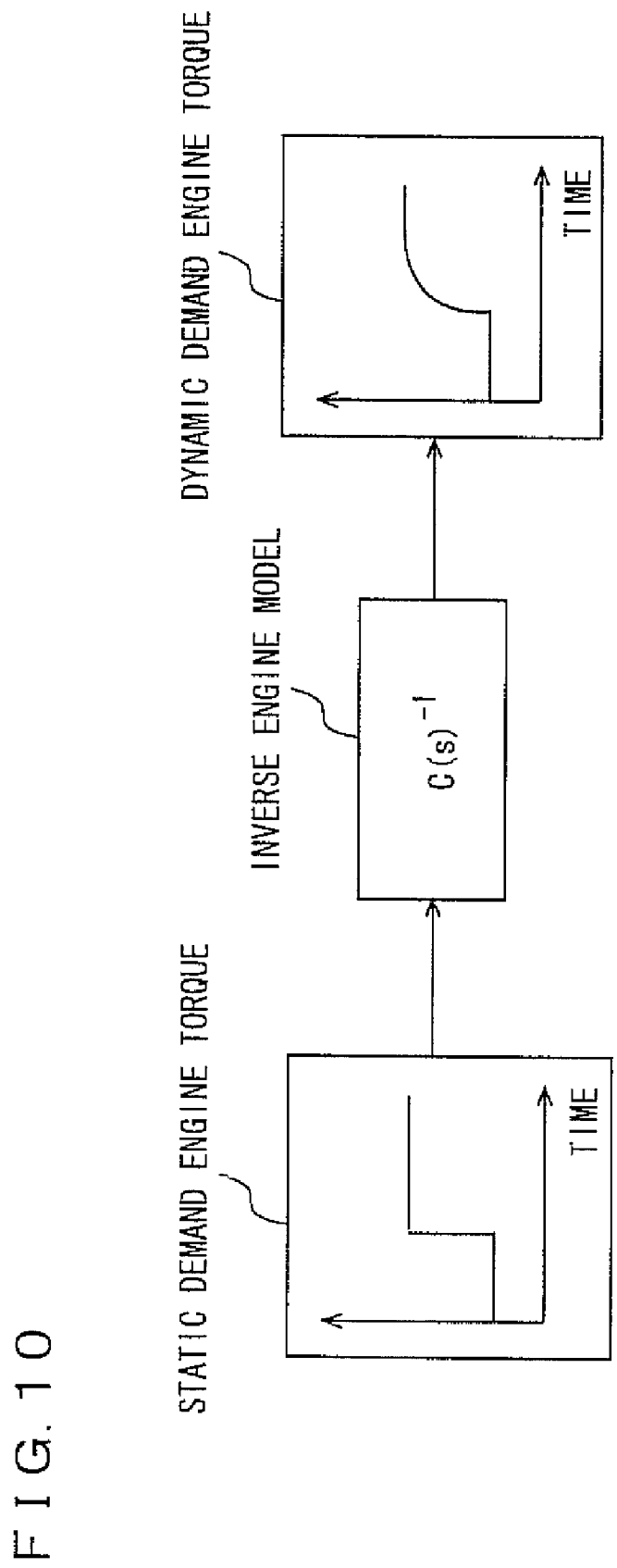
FIG. 10 is a diagram showing an inverse model C(s)-1 for converting static demand engine torque into dynamic demand engine torque.

As shown in FIG. 10, the static demand engine torque determined by first arbitration unit 9102 is converted into dynamic demand engine torque by inversely using engine model C(s) used to convert the dynamic demand engine torque into static demand engine torque in engine control system 9200. In other words, the static demand engine torque determined by first arbitration unit 9102 is converted into dynamic demand engine torque using an inverse model $C(s)^{-1}$. of engine model C(s).

Accordingly, the dynamic demand engine torque and the static demand engine torque can be converted bidirectiontionally based on the same correspondence. As a result, in a case where the demand engine torque converted once in conversion unit 9104 is determined as the demand engine torque for use in control of engine 1000 as a result of arbitration in second arbitration unit 9106 as described later, the demand engine torque can be returned to the original one accurately in engine control system 9200. Therefore, the control accuracy of engine 1000 can be improved more.

Figure 11:
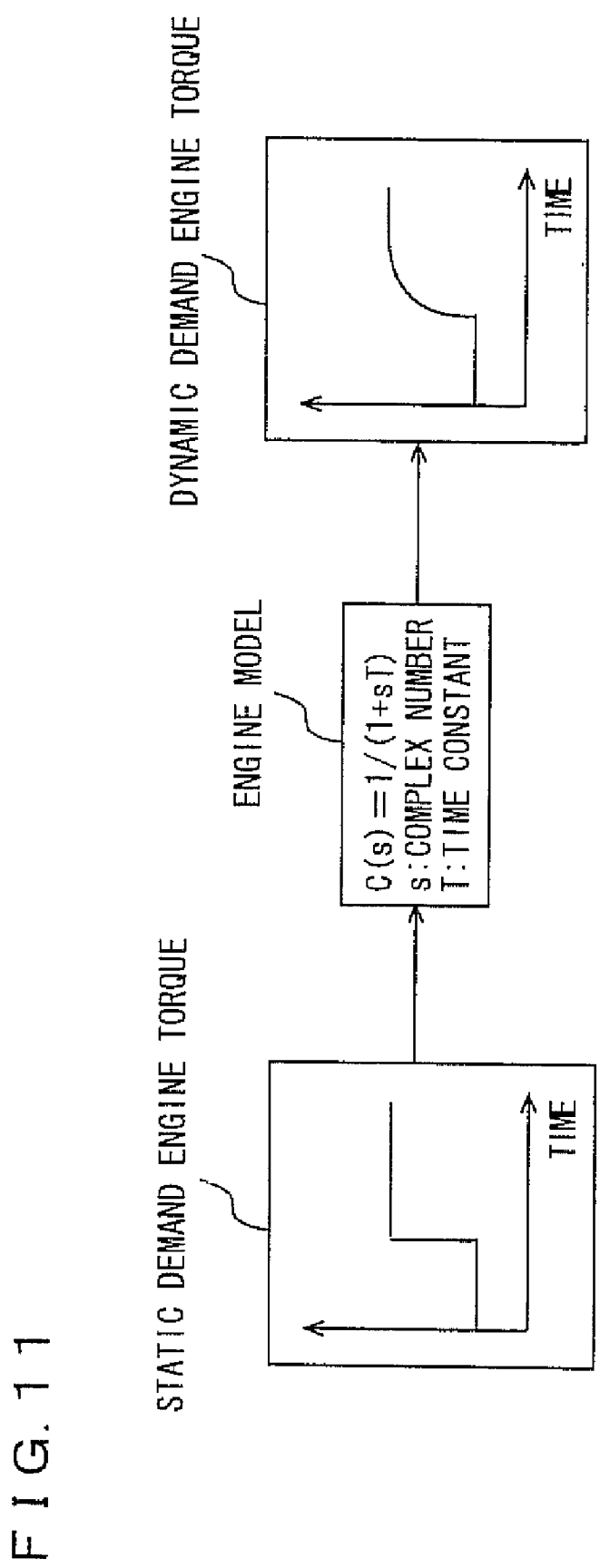
FIG. 11 is a diagram showing an engine model expressed by a first-order lag function.

Here, as shown in FIG. 11, the static demand engine torque may be converted into dynamic demand engine torque by adding a delay in control (during operation) of such components as throttle valve 8016 using engine model C(s) expressed by a first-order lag function. The time constant of the engine model shown in FIG. 10 varies depending on engine revolution number NE and engine torque.

Figure 12:
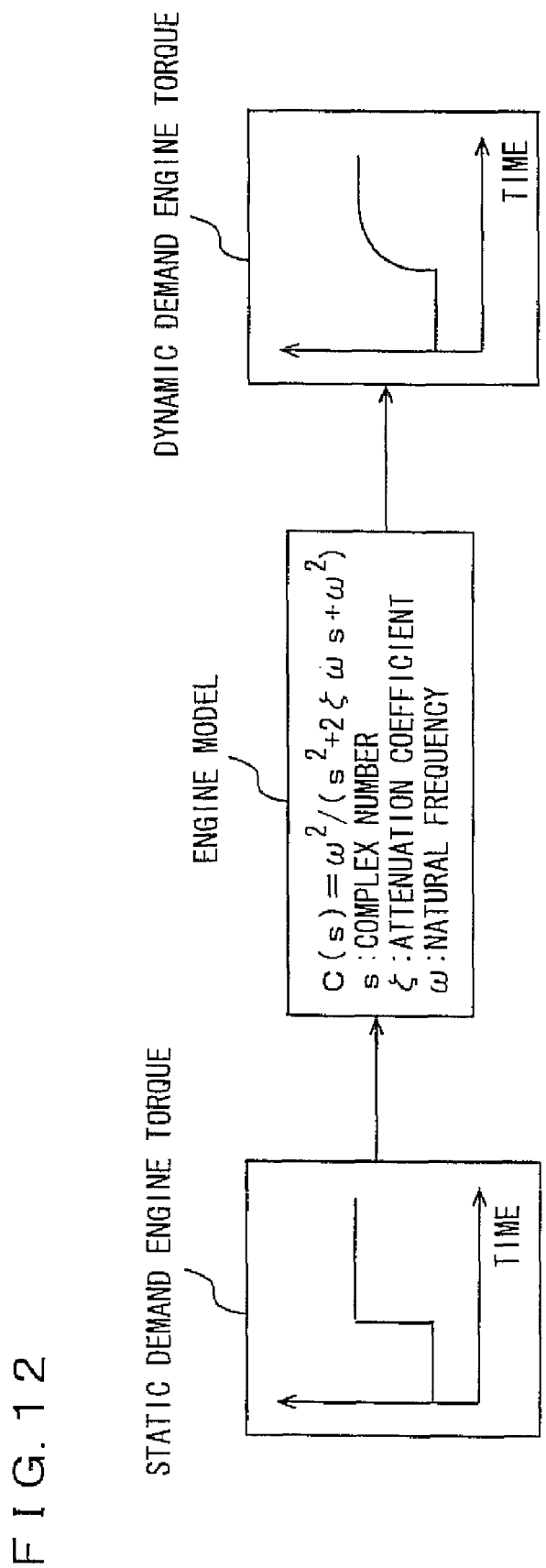
FIG. 12 is a diagram showing an engine model expressed by a second-order lag function.

Furthermore, as shown in FIG. 12, engine model C(s) expressed by a second-order lag function may be used. These engine models are subjected to Z-transform when implemented in ECU 8000.

Figure 13:
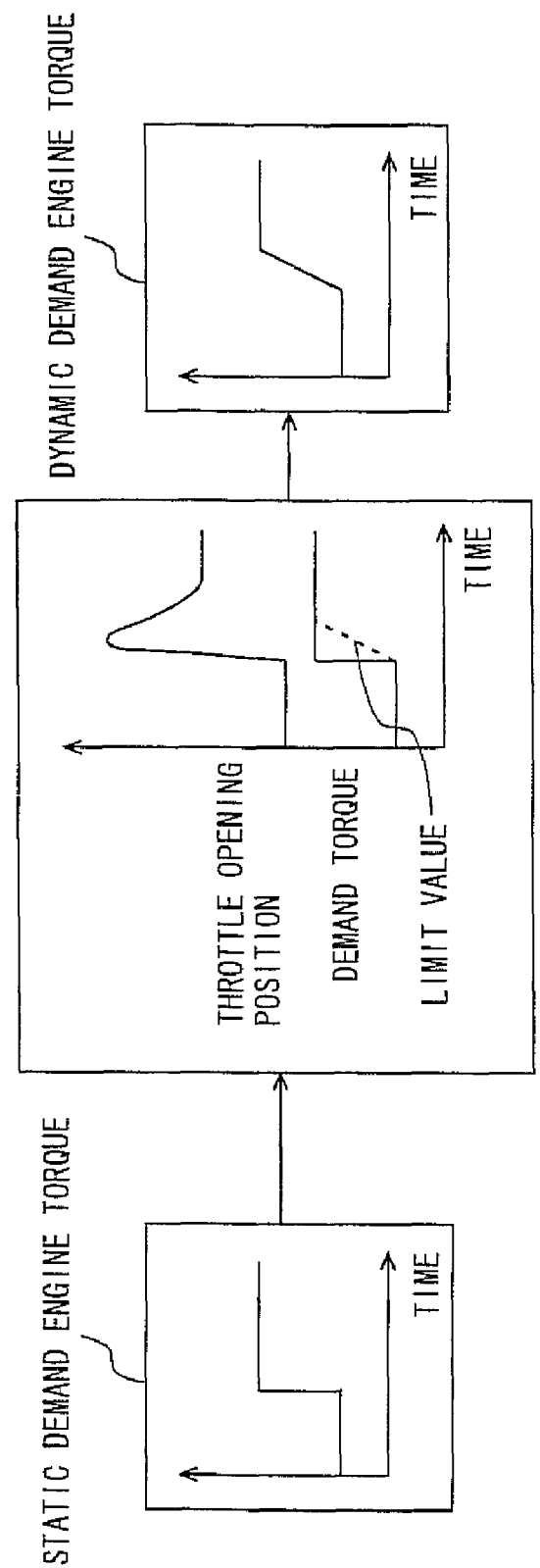
FIG. 13 is a diagram showing dynamic demand engine torque obtained by limiting static demand engine torque by a threshold value determined according to responsivity of components.

Furthermore, as shown in FIG. 13, the static demand engine torque may be converted into dynamic demand engine torque by limiting the static demand engine torque with a limit value determined depending on the responsivity of such components as throttle valve 8016. The limit value is predetermined, for example, by experiments and simulations.

In the present embodiment, the number of conversion unit 9104 converting the static demand engine torque into dynamic demand engine torque is one. In other words, only one static demand engine torque is converted into dynamic demand engine torque. Accordingly, the number of demand engine torques to be converted can be reduced. Therefore, conversion of the static demand engine torque into dynamic demand engine torque can be performed finely without increasing the processing load in conversion unit 9104. Therefore, the accuracy of the final resulting demand value can be improved.

Second arbitration unit 9106 of power train manager 9100 collects the dynamic engine torque converted from the static demand engine torque in conversion unit 9104, the dynamic demand engine torque set by VDIM system 9020, and the dynamic demand engine torque set by vibration suppression control system 9030. In addition, second arbitration unit 9106 arbitrates a plurality of dynamic demand engine torques so as to determine the dynamic demand engine torque for use in control of engine 1000 from among a plurality of dynamic demand engine torques input from conversion unit 9104, VDIM system 9020 and vibration suppression control system 9030.

For example, the maximum or minimum dynamic demand engine torque is determined as the dynamic demand engine torque for use in control of engine 1000, depending on the operation state of the vehicle. Furthermore, when a predetermined condition is satisfied, the dynamic demand engine torque from a particular system among conversion unit 9104, VDIM system 9020 and vibration suppression control system 9030 is determined as the dynamic demand engine torque for use in control of engine 1000. It should be noted that the method of arbitrating the dynamic demand engine torques is not limited to those described above.

The behavior of the vehicle can be controlled from more various aspects by arbitrating the dynamic demand engine torques set in a plurality of control systems, in second arbitration unit 9106.

The demand engine torque determined by second arbitration unit 9106 is input to engine control system 9200. In other words, the demand engine torque is requested of engine 1000 through engine control system 9200.

Power train manager 9100, power train driver model 9000, ECT torque control system 9010, VDIM system 9020, vibration suppression control system 9030, and engine control system 9200 are implemented in a distributed manner over a plurality of ECUs or computers.

For example, power train manager 9100 and power train driver model 9000 are implemented in a common ECU, and ECT torque control system 9010, VDIM system 9020, vibration suppression control system 9030, and engine control system 9200 are implemented separately in the respective ECUs.

It should be noted that power train manager 9100 and power train driver model 9000 may be implemented separately in the respective ECUs. Alternatively, ECUs may be integrated in any combination.

As described above, in accordance with the control apparatus according to the present embodiment, the static demand engine torques are set in the power train driver model and the ECT torque control system. The dynamic demand engine torques are set in the VDIM system and the vibration suppression control system. The static demand engine torques set in the power train driver model and the ECT torque control system are collected in the first arbitration unit of the power train manager. The first arbitration unit arbitrates the static demand engine torques set in the power train driver model and the ECT torque control system so as to determine one of the static demand engine torques set in the power train driver model and the ECT torque control system. The demand engine torque determined by the first arbitration unit is converted into dynamic demand engine torque. Accordingly, a plurality of demand engine torques different in characteristic can be uniformed. The dynamic demand engine torque converted from the static demand engine torque is collected in the second arbitration unit of the power train manager together with the dynamic demand engine torques set by the VDIM system and the vibration suppression control system. The second arbitration unit determines the dynamic demand engine torque for use in control of the engine from among the dynamic demand engine torque converted from the static demand engine torque by the conversion unit, the dynamic demand engine torque set by the VDIM system, and the dynamic demand engine torque set by the vibration suppression control system. In other words, arbitration is performed among the dynamic demand engine torque converted from the static demand engine torque by the conversion unit, the dynamic demand engine torque set by the VDIM system, and the dynamic demand engine torque set by the vibration suppression control system. Accordingly, more suitable demand engine torque can be obtained by considering both the dynamic demand engine torque and the static demand engine torque. The engine control system controls the engine according to the demand engine torque determined by the second arbitration unit. Therefore, the control accuracy of the engine can be improved.

It should be noted that arbitration between the static demand engine torques may be performed after all the demand engine torques are standardized to the static demand engine torque by converting the dynamic demand engine toque into the static demand engine torque.

Demand driving force for the vehicle may be used in place of the demand engine torque. In this case, engine control system 9200 may control engine 1000 such that the driving force of the vehicle becomes the demand driving force determined by second arbitration unit 9106. In other words, engine 1000 may be controlled such that the demand engine torque converted from the demand driving force is realized by multiplying the demand driving force by the radius of rear wheel 7000 and then dividing the result by the present gear ratio of automatic transmission 2000 and the gear ratio of differential gear 6000.

Furthermore, a demand acceleration for the vehicle may be used in place of the demand engine torque. In this case, engine control system 9200 may control engine 1000 such that the acceleration of the vehicle becomes the demand acceleration determined by second arbitration unit 9106. In other words, engine 1000 may be controlled such that the demand driving force as calculated by multiplying the demand acceleration by the vehicular weight is realized.

Alternatively, the dynamic demand engine torque may be set by a drivers support system in addition to VDIM system 9020 and vibration suppression control system 9030.

The drivers support system is a system that automatically sets the dynamic demand engine torque according to the behavior of the vehicle, using a cruise control system, a parking assist system, a pre-crush safety system, and the like.

The cruise control system is a system for maintaining the vehicle speed set by the driver. The parking assist system is a system for performing parking at a position set by the driver, completely automatically or partially automatically. For example, a steering operation and vehicle speed control for parking at a position set by the driver are performed automatically. The pre-crush safety system is a system for preventing a crush of the vehicle. For example, if the vehicle approaches another vehicle running ahead, the vehicle speed is controlled for deceleration.

The drivers support system automatically sets the demand engine torque necessary to perform such control, based on a map created beforehand by the developers.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control apparatus for a driving source mounted on a vehicle comprising:
    a plurality of first demand units that set one of a set of dynamic demand values and a set of static demand values concerning driving force of said vehicle;
    a first arbitration unit that collects the demand values set in said plurality of first demand units and arbitrating the demand values set by said plurality of first demand units so as to determine one demand value of the demand values set by said plurality of first demand units;
    a conversion unit that converts the demand value determined by said first arbitration unit into the other of said dynamic demand value and said static demand value by deriving the other of said dynamic demand value and said static demand value from the demand value determined by said first arbitration unit;
    a second demand unit that sets the other of said dynamic demand value and said static demand value;
    a second arbitration unit that collects the demand value converted by said conversion unit and the demand value set by said second demand unit and arbitrating the demand value converted by said conversion unit and the demand value set by said second demand unit so as to determine a demand value for use in control of said driving source from among the demand value converted by said conversion unit and the demand value set by said second demand unit; and
    a control unit that controls said driving source according to the demand value determined by said second arbitration unit.

2. The control apparatus for the driving source according to claim 1, wherein a number of said conversion unit is one.

3. The control apparatus for the driving source according to claim 1, wherein
    said control unit converts the demand value determined by said second arbitration unit into said one of said dynamic demand value and said static demand value using a model defining a correspondence between said dynamic demand value and said static demand value and controls said driving source according to the demand value converted into said one of said dynamic demand value and said static demand value, and
    said conversion unit converts the demand value determined by said first arbitration unit into the other of said dynamic demand value and said static demand value, using said model inversely.

4. The control apparatus for the driving source according to claim 1, wherein
    a plurality of said second demand units are provided, and
    said second arbitration unit collects the demand value converted by said conversion unit and the demand values set by said plurality of second demand units and arbitrates the demand value converted by said conversion unit and the demand values set by said plurality of second demand units so as to determine a demand value for use in control of said driving source from among the demand value converted by said conversion unit and the demand values set by said plurality of second demand units.

5. The control apparatus for the driving source according to claim 1, wherein
    said one of said dynamic demand value and said static demand value is a static demand value, and
    the other of said dynamic demand value and said static demand value is a dynamic demand value.

6. The control apparatus for the driving source according to claim 1, wherein
    said demand value is output torque of said driving source, and
    said control unit performs control such that output torque of said driving source becomes output torque determined by said second arbitration unit.

7. The control apparatus for the driving source according to claim 1, wherein
    said demand value is driving force of said vehicle, and
    said control unit controls said driving source such that driving force of said vehicle becomes driving force determined by said second arbitration unit.

8. The control apparatus for the driving source according to claim 1, wherein
    said demand value is an acceleration of said vehicle, and
    said control unit controls said driving source such that said acceleration of said vehicle becomes an acceleration determined by said second arbitration unit.

* * * * *

UNITED STATES PATENT AND TRADEMARK OFFICE
CERTIFICATE OF CORRECTION

| | |
|---|---|
| PATENT NO. | : 8,019,524 B2 |
| APPLICATION NO. | : 12/580444 |
| DATED | : September 13, 2011 |
| INVENTOR(S) | : Toshiya Oishi et al. |

It is certified that error appears in the above-identified patent and that said Letters Patent is hereby corrected as shown below:

Column 1, line number 5 after "2008" delete ".".

Column 1, line number 39 after "290235" delete ".".

Column 2, line number 7 after "290235" delete ".".

Signed and Sealed this
Twenty-seventh Day of November, 2012

David J. Kappos
*Director of the United States Patent and Trademark Office*